Nov. 9, 1954 — L. A. RICHARDS — 2,693,932
VACUUM OPERATED DIAPHRAGM VALVE
Filed April 17, 1950
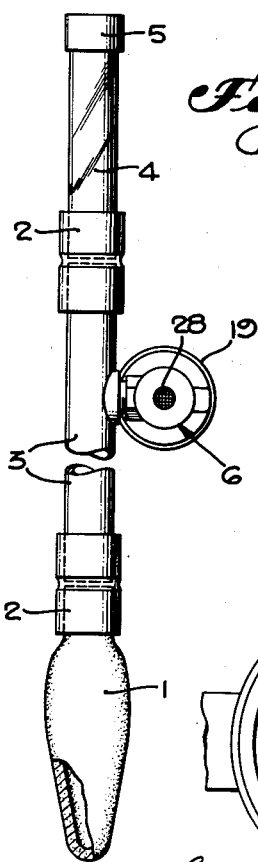
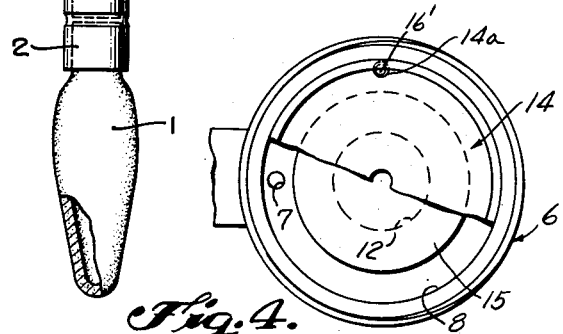
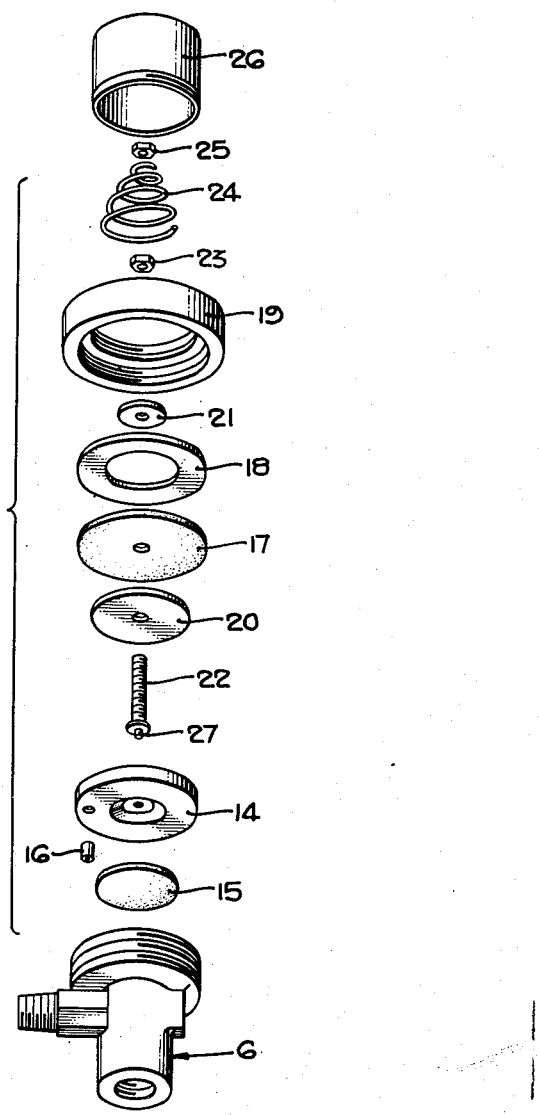
LORENZO A. RICHARDS,
INVENTOR.
BY 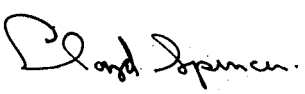
ATTORNEY

United States Patent Office 2,693,932
Patented Nov. 9, 1954

2,693,932

VACUUM OPERATED DIAPHRAGM VALVE

Lorenzo A. Richards, Riverside, Calif.

Application April 17, 1950, Serial No. 156,316

5 Claims. (Cl. 251—61)

My invention relates to vacuum operated valves. The present application is a continuation-in-part of my co-pending application entitled: Method and Apparatus for Irrigating Plants, filed June 24, 1948, Serial Number 34,946, now Patent No. 2,674,490 of April 6, 1954.

Among the objects of my invention are:

First, to provide a vacuum operated valve which requires a minimum volume displacement to effect operation and is therefore particularly suited for operation by the sensitive element of my irrigation control apparatus disclosed in the above identified patent.

Second, to provide a vacuum operated valve which incorporates a dual or differential diaphragm means disposed on opposite sides of a vacuum chamber and a force transmitting member extending therebetween and so arranged that, on establishment of vacuum pressure, the larger of the diaphragms causes said member to extend the other diaphragm for the purpose of operating an adjacently disposed valve element.

Third, to provide a vacuum operated valve, in which vacuum pressure controls flow in a pressure line isolated therefrom, wherein the effective area subjected to the pressure in said pressure line is maintained at a minimum so that the variation in pressure in the pressure line has a minimum effect on the value of the vacuum pressure required to cause operation.

With the above and other objects in view as may appear hereinafter, reference is directed to the accompanying drawings, in which:

Figure 1 is an elevational view of a vacuum producing device such as a soil moisture sensitive element of the type shown in my co-pending application, with my vacuum control valve shown in association therewith.

Figure 2 is an enlarged transverse sectional view of the vacuum control valve.

Figure 3 is an exploded view of my vacuum control valve.

Figure 4 is an end view of the valve body with the cap removed showing an alternative arrangement of the vacuum port.

My vacuum operated valve is particularly applicable in those cases wherein the available displacement of fluid in the vacuum system is particularly limited; for example in conjunction with the sensitive element of my automatic irrigation apparatus disclosed in my patent. Said sensitive element includes a porous cell 1; that is, a chamber or cup formed of porous ceramic material and suitably connected as by a yieldable sleeve 2 to a tube 3, having at its upper end a sight tube 4 of transparent material and a sealing cap 5.

My vacuum operated valve includes a valve body 6 having a vacuum port 7 which communicates with the tube 3, and with a cavity 8 of relatively large diameter and shallow depth formed in one end of the valve body. The valve body is also provided with an inlet 9 and outlet 10 arranged for connection respectively to a fluid supply line and discharge line, not shown. The inlet 9 is preferably coaxial with the cavity 8, and receives a valve element 11. A tire valve has been found satisfactory; however, any suitable type of small valve element may be used. The outlet 10 intersects the cavity 8 close to the inlet. In this region the cavity may have a small socket 12 to accommodate the stem 13 of the valve element.

The cavity 8 receives a shallow cup 14 the base of which covers the bottom of the cavity and bridges the socket 12. A diaphragm 15 is interposed between the cup 14 and the bottom of the cavity and likewise covers the socket 12. The vacuum port 7 is located at one side of the cavity and may terminate in a tubular pin 16 which protrudes through a small hole at the side of the cup 14 to afford communication between the interior thereof and the vacuum port as well as to restrain the cup against rotation during assembly.

Alternatively, the tubular pin 16 may be replaced by a solid pin 16', shown in Fig. 4, mounted in a suitable hole in the valve body at the top of cavity 8 and displaced 90° from the position shown for the tubular pin in Figure 2. The hole in cup 14 is then constrained to the top center position during and after assembly. With this arrangement, vacuum connection to the inter-diaphragm space is made from port 7, around through the annular space peripheral to diaphragm 15 and through the upper hole in cup 14. This makes possible complete air removal from and liquid fill of the inter-diaphragm space inside cup 14 even with the valve body fixed in the position shown in Figure 1.

The outer rim of the cup is flush with the outer face of the valve body surrounding the cavity 8 and a second diaphragm 17 covers both. A ring 18 overlies the diaphragm 17 and is pressed against the diaphragm by a flanged collar 19 internally threaded to engage external threads on the valve body.

The central portion of the diaphragm 17 is clamped between a larger clamp disk 20 at its under side within the cup 14 and a smaller clamp disk 21 within and spaced from the ring 18. A threaded stem 22 extends through the disks and diaphragm and receives a nut 23 to secure the disks tightly. The stem extends further to receive a coil spring 24 and a second nut 25. The spring 24 is conical and its larger end rests on the ring 18. A cap 26 encloses the spring.

The inner end of the stem may form an integral operating pin 27, or, if desired, the operating pin may be a separate member. In either case the pin extends through a small hole in the base of the cup 14 and engages the diaphragm 15 in alinement with the stem 13 of the valve element 11.

A strainer 28 is preferably provided in the inlet port of the valve body.

Operation of my vacuum control valve is as follows:

Vacuum pressure applied through the port 7 to the interior of the cup 14 causes the diaphragm 17 to be depressed in opposition to the force of the spring 24. When this force is sufficient, the diaphragm 17 acting through pin 27 causes the central portion of the diaphragm 15 to protrude and engage the stem 13 of the valve element 11 so that fluid may pass between the inlet 9 and outlet 10 as long as the vacuum pressure is maintained.

It will be observed that the volumetric displacement to accomplish operation is very small. Also, the effective area of the diaphragm 15 is not appreciably larger than the pin for if subjected to fluid pressure from within the socket 12 it tends to conform to the adjacent base of the cup member and to the protruding end of the pin. Thus, although pressure in the socket 12 has some influence on the vacuum pressure required to open and hold open the valve, this influence is sufficiently small to be negligible, even if the fluid pressure controlled by the valve may be a hundred pounds or more.

Many other embodiments of the invention may be resorted to without departing from the spirit of the invention.

I claim:

1. A vacuum operated valve, involving: a valve body defining a cavity, a pressure fluid passage interrupted by said cavity, and a port for connection with a source of vacuum pressure and communicating with said cavity; a valve means in said pressure fluid passage and operatively accessible to said cavity; a first diaphragm covering said cavity; a cap fitting over said diaphragm; a second diaphragm in said cavity; and a separator cup between said diaphragms clamped by said cap, said second diaphragm covering said valve means and isolating said pressure fluid passage from the remainder of said cavity; means defining a passageway from said vacuum port to the interior of said cup between said diaphragms; a force transmitting member disposed in said cup between said diaphragms, said second diaphragm having a lesser effective area than the first diaphragm whereby, on application of vacuum pressure, said force transmitting member causes said second diaphragm to protrude and engage said valve means.

2. A vacuum operated valve, involving: a valve body defining a cavity, a pressure fluid passage interrupted by said cavity, and a port for connection with a source of vacuum pressure and communicating with said cavity; a valve means in said pressure fluid passage and operatively accessible to said cavity; a first diaphragm covering said cavity; a cap fitting over said diaphragm; a second diaphragm in said cavity; and a separator cup between said diaphragms clamped by said cap, said second diaphragm covering said valve means and isolating said pressure fluid passage from the remainder of said cavity; means defining a passageway from said vacuum port to the top of the interior of said cup between said diaphragms; a force transmitting member disposed in said cup between said diaphragms, said second diaphragm having a lesser effective area than the first diaphragm whereby, on application of vacuum pressure, said force transmitting member causes said second diaphragm to protrude and engage said valve means.

3. A vacuum operated valve as set forth in claim 1 wherein: a spring urges said first diaphragm in opposition to said vacuum pressure and means is provided to vary the force of said spring.

4. A vacuum operated valve, involving: a valve body defining a cavity, a pressure fluid passage intersecting the bottom of said cavity, and a port for connection with a source of vacuum pressure and communicating with said cavity; a valve means in said pressure fluid passage and having an operating end accessible to said cavity; an inner diaphragm at the bottom of said cavity and covering said passage and valve means; a second diaphragm in said cavity; a separator between said diaphragms; means for clamping said outer diaphragm and causing said separator to clamp said inner diaphragm; means defining a passageway from said vacuum port to the region between said diaphragms; a force transmitting member disposed between said diaphragms, said inner diaphragm having a lesser effective area than the outer diaphragm whereby, on application of vacuum pressure between said diaphragms, said force transmitting member causes said inner diaphragm to protrude into said pressure fluid passage and engage said valve means.

5. A vacuum operated valve as set forth in claim 4, wherein: a spring urges said outer diaphragm in opposition to said vacuum pressure and means is provided to vary the force of said spring.

References Cited in the file of this patent

UNITED STATES PATENTS

| Number | Name | Date |
|---|---|---|
| 1,933,043 | Bracke | Oct. 31, 1933 |
| 1,950,121 | McKee | Mar. 6, 1934 |
| 2,587,375 | Paulsen | Feb. 26, 1952 |